US008060285B2

(12) United States Patent
Chigusa (10) Patent No.: US 8,060,285 B2
(45) Date of Patent: Nov. 15, 2011

(54) SYSTEM AND METHOD OF INTELLIGENT AGENT MANAGEMENT USING AN OVERSEER AGENT FOR USE IN VEHICLE DIAGNOSTICS

(75) Inventor: Shunsuke Chigusa, Arlington, MA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1580 days.

(21) Appl. No.: 11/411,289

(22) Filed: Apr. 26, 2006

(65) Prior Publication Data
US 2007/0265735 A1    Nov. 15, 2007

(51) Int. Cl.
G06F 19/00 (2006.01)
(52) U.S. Cl. ................ 701/63; 701/29; 726/26
(58) Field of Classification Search .......... 701/29, 701/63; 726/26
See application file for complete search history.

(56) References Cited

U.S. PATENT DOCUMENTS

| 5,124,909 | A | 6/1992 | Blakely et al. |
| 5,375,207 | A | 12/1994 | Blakely et al. |
| 5,870,768 | A | 2/1999 | Hekmatpour |
| 5,944,783 | A | 8/1999 | Nieten |
| 5,953,514 | A | 9/1999 | Gochee |
| 6,012,152 | A | 1/2000 | Douik et al. |
| 6,023,565 | A | 2/2000 | Lawman et al. |
| 6,108,616 | A | 8/2000 | Borchers et al. |
| 6,349,342 | B1 | 2/2002 | Menges et al. |
| 6,505,231 | B1 | 1/2003 | Maruyama |
| 6,684,285 | B2 | 1/2004 | Farmwald et al. |
| 6,769,125 | B2 | 7/2004 | Menges et al. |
| 6,912,522 | B2 | 6/2005 | Edgar |
| 6,950,782 | B2 | 9/2005 | Qiao et al. |
| 6,988,279 | B1 | 1/2006 | Kanevsky |
| 6,996,667 | B2 | 2/2006 | Aoki et al. |
| 7,036,128 | B1 | 4/2006 | Julia et al. |
| 7,233,879 | B1 | 6/2007 | Chigusa |
| 2002/0120696 | A1 | 8/2002 | Mousseau et al. |
| 2003/0037177 | A1 | 2/2003 | Sutton et al. |
| 2004/0205772 | A1 | 10/2004 | Uszok et al. |

(Continued)

OTHER PUBLICATIONS

Robert-Jan Beun et al. "Ontological Feedback in Multiagent Systems" Autonamous Agents and Multi-Agent Systems '04 Conference, Jul. 19-23, 2004, New York, NY USA, pp. 110-117.

(Continued)

*Primary Examiner* — Creighton Smith
(74) *Attorney, Agent, or Firm* — Gifford, Krass, Sprinkle, Anderson & Citkowski, P.C.; Thomas E. Anderson (57) ABSTRACT

A system and method of intelligent agent management within a vehicle intelligent agent system includes a host system, an overseer agent, and an agent that are all in communication via a communications network. The system includes an executable overseer agent management program that uses the identification code of the agent to determine if the agent identification code has been copied and deletes the agent from the intelligent agent system if the agent identification code has been copied. If the agent identification code has not been copied, the agent gathers new information, and the information in the agent knowledge database is updated using the new information and the updated information is transferred from the agent knowledge database to the overseer agent knowledge database. The overseer agent checks the validity of the transmitted information, and agent is deleted and a new agent is generated if the learned information is not valid.

14 Claims, 4 Drawing Sheets

U.S. PATENT DOCUMENTS

| | | |
|---|---|---|
| 2005/0004974 A1 | 1/2005 | Sharma et al. |
| 2005/0027480 A1 | 2/2005 | Qiao et al. |
| 2005/0187668 A1 | 8/2005 | Baumgarte |
| 2005/0216757 A1 | 9/2005 | Gardner |
| 2006/0031538 A1 | 2/2006 | Motoyama et al. |
| 2006/0064291 A1 | 3/2006 | Pattipatti et al. |
| 2007/0265735 A1 | 11/2007 | Chigusa |

OTHER PUBLICATIONS

Weiss at al, "Design and Implementation of a Real-Time Multi-Agent System," 1998, IEEE Article, pp. 1269-1273.

SYSTEM AND METHOD OF INTELLIGENT AGENT MANAGEMENT USING AN OVERSEER AGENT FOR USE IN VEHICLE DIAGNOSTICS

BACKGROUND OF THE INVENTION

1. Field of the Invention

The present invention relates generally to computer-assisted vehicle diagnostics and, more specifically, to a system and method of intelligent agent management using an overseer agent for use in vehicle diagnostics.

2. Description of the Related Art

Vehicles, and in particular motor vehicles, frequently incorporate monitoring systems that function to monitor the status of various vehicle components. An on-board diagnostic system (OBD) is frequently utilized in monitoring the engine, emissions, transmission or other key vehicle systems. The information obtained by such a monitoring system may be useful in detecting a vehicle condition, such as a malfunction, or other such abnormal operating condition. A key feature of the on-board diagnostic system is the ability to notify the vehicle operator of the detected vehicle condition. Early detection, diagnosis, or notification of a malfunction is important to the continued operation of the vehicle.

While the on-board diagnostic systems work well, they may not provide information regarding causation. Intelligent agent diagnostic systems are known to collect and transfer data within an electronic system that may be relevant to causation. An example of a multi-agent diagnostic system for a vehicle that can detect and isolate a fault is described in commonly assigned U.S. patent application Ser. No. 10/629, 035, which is incorporated herein by reference.

The above-described system works well for fault isolation. A system and method of intelligent agent identification is disclosed in commonly assigned U.S. patent application Ser. No. 11/282,925, which is incorporated by reference. This patent application provides security concerning the ingress and egress of an agent to the system. Thus, there is a need in the art for a system and method of intelligent agent management for an intelligent agent system that improves the security of the intelligent agent system by searching for a malicious agent using an overseer agent.

SUMMARY OF THE INVENTION

Accordingly, the present invention is a system and method of intelligent agent management for an intelligent agent system for a vehicle. The system includes a host computer system having a processor, a memory associated with the processor and an input/output means. The system also includes an overseer agent and an agent. The host system, overseer agent and agent are operatively in communication via a communication network. An executable overseer agent management program is maintained by the overseer agent.

A method of intelligent agent management using an overseer agent within an intelligent agent system for a vehicle is provided. The method includes the steps of selecting an agent within the intelligent agent system for the vehicle and receiving an encrypted identification code by the agent. The overseer agent determines if the agent identification code has been copied and deletes the agent from the intelligent agent system if the agent identification code has been copied, and continues to check for a non-conforming agent if the agent identification code has not been copied. The agent is provided with information from a host system within the intelligent agent system, and executes the instructions in the information and updates information in the agent knowledge database with the new information. The updated information is transferred from the agent knowledge database to the overseer agent knowledge database of the overseer agent via the communications network. The overseer agent checks the validity of the transmitted information from the agent, and deletes the invalid agent from the intelligent agent system and generates a new agent if the learned information from the agent is not valid.

A method of managing information stored in an intelligent agent knowledge database for the intelligent agent system is provided that uses the overseer agent to monitor the agent. The information obtained by the agent is transferred from the agent to a host system via the communications network. The transferred information is compared to predetermined information stored in the host knowledge database to determine if the information is valid. The predetermined information in the host knowledge database is updated using the validated information, and the validated information is transferred back to the agent for use by the agent, if the information is valid. The agent is deleted from the intelligent agent system if determined that the information is not valid.

A method of transferring information between intelligent agents is provided that transfers information from the agent knowledge database to a memory area of a receiver agent. The receiver agent requests that a single task processor having controller and a database divided into a program area and a data area, reserve a portion of memory in the data area. The transferred information from the agent knowledge database is forwarded to the reserved memory in the single task processor and stored there until a predetermined condition is met. The transferred information is deleted from the reserved memory area of the processor when the predetermined condition is met, and the reserved memory is released for other uses.

One advantage of the present invention is that a system and method of intelligent agent management for an intelligent agent system is provided that facilitates identification of a non-conforming agent within a vehicle. Another advantage of the present invention is that a system and method of intelligent agent management using an overseer agent is provided that identifies a non-conforming agent within an electronic system for the vehicle. Still another advantage of the present invention is that a system and method of intelligent agent management using an overseer agent is provided that prevents access to the electronic system by a non-conforming agent. A further advantage of the present invention is that a method of transferring information between knowledge management databases is provided. Still a further advantage of the present invention is that a method of validating information in a host database is provided.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
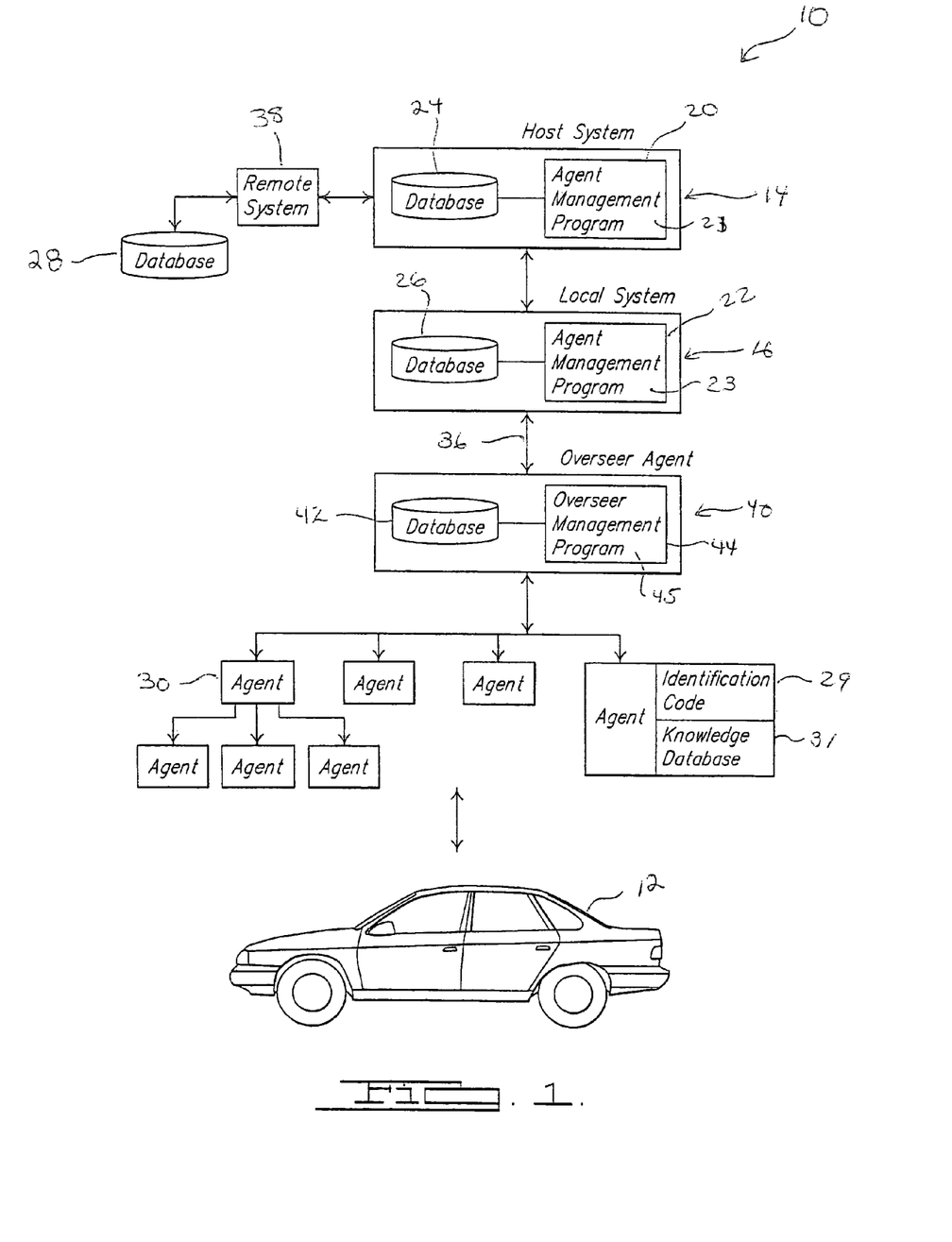
FIG. 1 is a diagrammatic view of a system for use in conjunction with a method of agent management using an overseer agent in an electronic system, according to the present invention.

Referring to FIG. 1, a system 10 for intelligent agent management using an overseer agent in an electronic system is provided. In this example, the electronic system is incorporated in a vehicle 12, and in particular an automobile. The vehicle electronic system includes an intelligent diagnosis and repair feature. Expert agents, each having a specific function, are dispersed within the electronic system of the vehicle in order to monitor its behavior.

The system for agent management using an overseer agent includes at least one intelligent agent 30 disposed within the vehicle electronic system in a predetermined manner. For example, the agents 30 may be arranged in hierarchical layers. The agents 30 obtain data that is analyzed and utilized by the vehicle. In this example, the data is used for intelligent vehicle diagnostics. The intelligent agent encompasses many forms. For example, the intelligent agent may be a sensing means, such as a sensor. The intelligent agent may be an electronic control having a microprocessor, a memory, an input, an output and necessary operating software. The intelligent agent may also be an Application Specific Integrated Circuit (ASIC) incorporated into a computer controller. As such, the system may simultaneously include various types of agents, depending on the diagnostic task to be performed. One function of the agent 30 is to carry information in the form of executable program code to a particular component in the electronic system of the vehicle. Another function of the agent is to gather new information or knowledge. The agent 30 includes a processor 29 and a knowledge database 31. An executable software program to carry out instructions may be stored within the processor. The memory provides for storage of information.

Recognition of the agent 30 is advantageous in preserving the integrity of the information. A non-identified agent or a non-conforming agent 30 may carry information that could have a negative impact on the vehicle 12. The agent 30 may be identified within the system 10 using an identification code, or other identification information useful for identification verification purposes. The type of identification information may be a name or number or the like and the format is non-limiting.

The system 10 further includes an overseer agent 40 that watches over the agents 30 to ensure that all of the agents 30 operating in the system 10 are conforming. The overseer agent is located at the vehicle level, and may be part of the local system (to be described). The overseer agent 40 identifies a non-identified agent or a non-conforming agent, and takes predetermined action when such an agent is discovered. The overseer agent 40 includes a processor 44 having a memory means, an input/output interface means and operational software programs. The overseer agent 40 also includes an overseer agent knowledge management database 42 that is operatively in communication with the host system 14 and the local system 16 via a communications network 36. The overseer agent knowledge database stores information that is beneficial to performing diagnostic fault isolation. Executable software programs are maintained in the overseer knowledge database. The overseer agent software program 45 is maintained by this database. This software program identifies a non-conforming agent, deletes the non-conforming agent from the system, and manages the transfer of information within the system 10 using the methodology to be described.

The system for agent management 10 includes a communication network 36 that selectively receives, transmits or monitors data communications between the various components within the system. Various different types of communication means may be simultaneously incorporated within the communication network 36. The communication means may be wired or wireless type connection, or the like. An example of a wired communication means is a data bus. An example of a LAN/WAN communication means is an intranet or internet. The communication network 36 may include other types of linked communication devices, such as facsimile, telephone, pagers or cellular phones or the like.

The intelligent agent management system includes a host system 14 operatively in communication with a local system 16 via the communication network 36. The local system 16 is also operatively in communication with the overseer agent 30 via the communications network 36. The host system 14 includes a processor 20 having a memory means, a data storage device 24, an input/output interface means, and operational software programs. In this example, the host system 14 is a server. It should be appreciated that various other peripheral devices may be connected to the host system 14, such as another remotely located data storage device 28, or another computer system 38. Preferably, the host system 14 is a central computer facility remotely located from the vehicle.

The local computer system 16 is typically located at the vehicle level. An example of a local computer system 16 for a vehicle is an electronic control unit, or ECU. The local computer system 16 includes an input means, a processor 22 having a memory means, a communication means and an output means. There may be a local database 26 associated with the processor. The local data storage device 26 may be a fixed memory device, such as a database or the like. Alternatively, the local data storage device is a removable memory, such as a memory stick, memory card or the like.

The host computer system 14 and the local computer system each maintain various software programs necessary to the operation of the system. For example, an agent management software program 21, 23 coordinates the functions of the various agents 30 disposed within the system. An example of an agent management program is disclosed in commonly assigned U.S. patent application Ser. No. 11/282,925, which is incorporated by reference. In particular, the agent management software program 21, 23 coordinates activities such as the addition of an agent, the deletion of an agent, the education of an agent and the generation of identification code for the agent, or the like. In this example, the agent management program 21, 23 also coordinates the diagnostic tasks performed by the agents. The agent management program may select an agent that is appropriate for a performing a task within a predetermined vehicle operating condition, such as sense information from a vehicle component. The agent management program 21, 23 may collect information received by the agent. In addition, the agent management program may perform a diagnostic analysis of the collected information, or transfer the information to another remotely located system 38 capable of performing diagnostics. The agent management program 21, 23 may further select another agent to perform a function based on the information collected by a lower level agent.

The agent management program 21, 23 also coordinates communications within the system. It should be appreciated that in this example, the agent management program selects a destination within the system for a predetermined agent. The selection of a particular destination may be beneficial in balancing the work load between various areas of the vehicle. That is, an ECU with a high task load may be avoided in favor of an ECU with a lower task load. The host agent management program 21 also may keep track of the incoming and outgoing agents within the host system, to assist in the identification of each incoming or outgoing agent. The agent management program 21 may also verify the identity of an agent 30 entering the host system 14. This program advantageously distinguishes between an allowable agent and an illegal or non-conforming agent. The agent verification may occur at the host level or the local system level or both levels.

Information relevant to the function of the agent, such as an executable program code, is preferably maintained by the local system 16, and a copy may also be stored in the host system 14. This program contains the executable program code carried by the identified agent, such as instructions to perform a particular function. This function may include data logging, user input or output, or diagnostics or the like.

The system for agent identification 10 may include other components or features relevant to the above-described system and the method to be described. For example, the system may include an indicator means for providing a message to the vehicle operator. The indicator means may be a visual means, such as an LED, CRT or LCD display or the like; or an audio means, such as a voice alarm or sound alarm or the like; or any other means of alerting the vehicle operator. The system may include an interactive means for transmitting an input from a vehicle operator to the intelligent diagnostic system.

Figure 2:
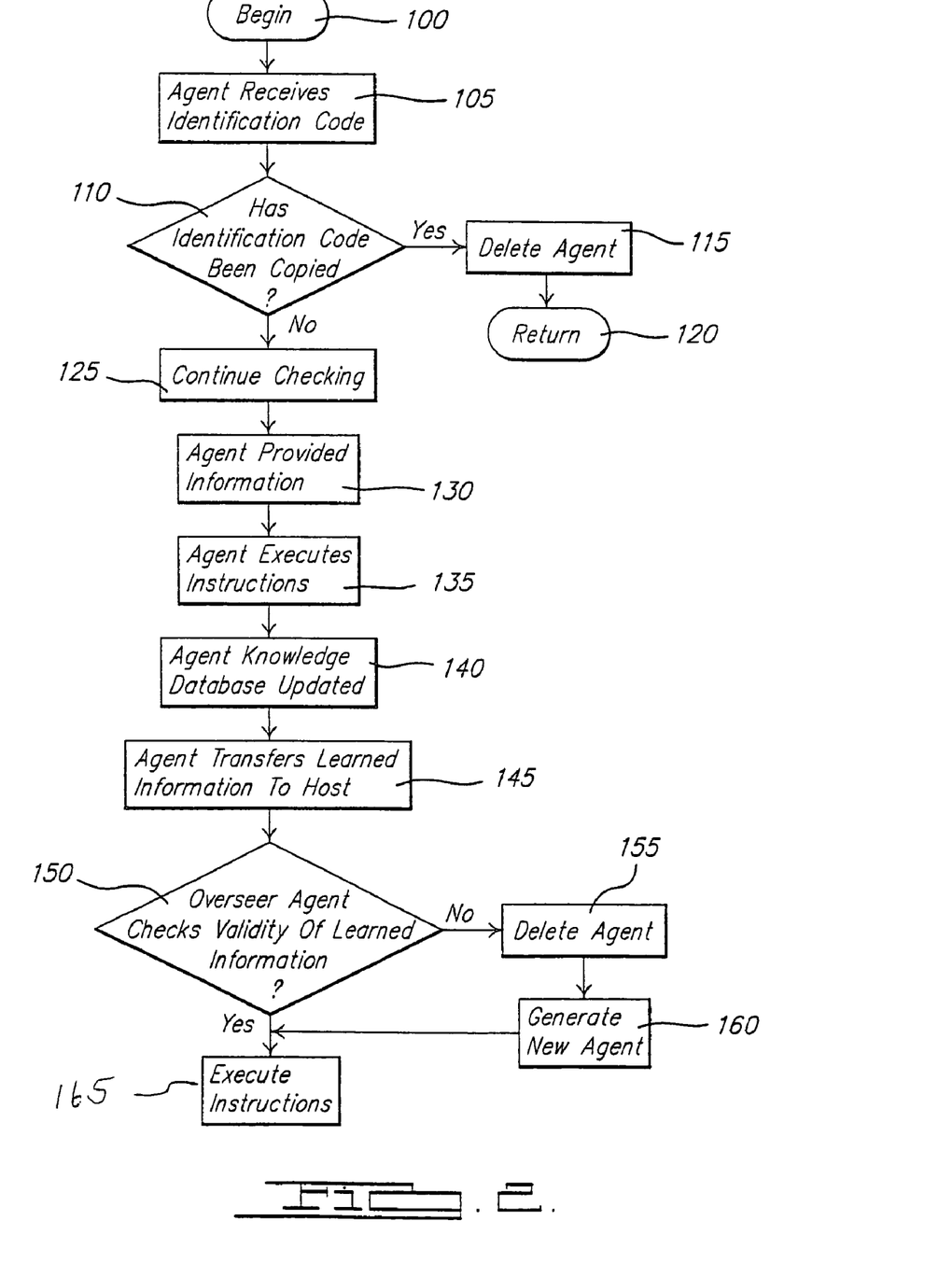
FIG. 2 is a flowchart illustrating the method of agent management using an overseer agent in an electronic system using the system of FIG. 1, according to the present invention.

Referring to FIG. 2, a method of intelligent agent management using an overseer agent is provided. The method is implemented by the system 10 described with respect to FIG. 1. The methodology identifies a non-conforming agent 30 seeking entry into the system 10 at any level, including the host system 14 or the local system 16. The methodology begins in block 100 when called for, and continues to block 105. The methodology is called for as part of the execution of the overseer management software program.

In block 105, the agent receives a unique identification code. The identification code can be obtained from various sources, such as the host agent management program 21 or local agent management program 23 associated with the system 10. The agent identification code is encrypted for security and identification purposes. Various encryption techniques are available in the art. It should be appreciated that the encryption may be performed at the host or alternatively at the local level. A non-limiting example of an encryption technique is the Data Encryption Standard (DES), a symmetric algorithm adopted in the United States as a federal standard. Another technique is the International Data Encryption Algorithm (IDEA). Other commonly available asymmetric techniques are the RSA algorithm, Pretty Good Privacy (PGP), Secure Sockets Layer (SSL), and Secure Hypertext Transfer Protocol (S-HTTP). A Clipper algorithm (called Skipjack) is specified in the Escrow Encryption Standard (EES), a voluntary federal standard for encryption of voice, facsimile (fax), and data communications over ordinary telephone lines.

In block 110, the methodology determines if the encrypted identification code carried by the agent 30 has been copied. For example, the identification code may have a flag that is set if the code is copied, and the flag is checked by the overseer agent 40. It assumed that the information carried by the agent 30, including the identification code, is corrupt or non-conforming if the identification code has been copied.

The methodology advances to block 115 and the overseer agent deletes the agent from the system, if the agent identification code has been copied. The methodology advances to block 120 and returns.

Returning to block 110, if the agent identification code has not been copied, the methodology advances to block 125. In block 125 the overseer agent 40 continues to determine whether the agent 30 is a non-conforming agent using the agent's acquisition knowledge or information.

In block 130, the host system 14 of the example periodically provides the agent with information that is stored in memory that is associated with the agent. It should be appreciated that the local system 16 may also provide the agent with information in this manner. Preferably this information includes instructions for work to be executed by the agent, such as executable program code. The information may be transferred using the methodologies described with respect to FIG. 3 or 4.

The methodology advances to block 135, and the agent 30 executes the instructions, and in doing so generates information. For example, the agent application program executes the work instructions to obtain information. In this example, the information is useful in the diagnostics of the electronic system of the vehicle 12. One example of a work instruction is to sense a temperature of a predetermined component. Another example of a work instruction is to sense a speed of the vehicle.

The methodology advances to block 140 and the agent 30 updates the agent knowledge database 31 with the information obtained from the work it has performed. Preferably, the information in the agent knowledge database 31 is adaptively updated. That is, the newly learned information is added to the database and modifies the existing information in the database. The methodology may encrypt the information obtained by the agent through the local application program, using an encryption technique, as previously described. It should be appreciated that the encryption steps improve the security of the system.

The methodology advances to block 145 and the agent 30 transfers the learned information stored in its knowledge database 31 to the overseer agent 40 via the communications network 36. It should be appreciated that the learned information may also be transferred to a knowledge database 42 associated with the overseer agent 40 in a manner to be described.

The methodology advances to block 150 and the overseer agent 40 checks the validity of the learned information from the agent 30. For example, the overseer agent 40 may compare the deciphered learned information to predetermined information maintained in the knowledge database 42 associated with the overseer agent. Again, the multiple redundancies improve the security of the system. It should be appreciated that the overseer agent 40, local computer system 16 and host computer system 14 each utilize the same decipherment rule in comparing the information carried by the selected agent. An example of predetermined information is a range of numeric values. An example of a predetermined condition is if a sensed temperature is within a predetermined range of temperatures. It should be appreciated that the validity may be checked on a periodic basis. If the information does correlate, the methodology advances to block 165 and continues.

Returning to block 150, if the information is not valid, the agent 30 is non-conforming and the methodology advances to block 155. In block 155 the non-conforming agent is deleted from the system. For example, the agent 30 may be deleted by the local system by erasing the agent from the memory associated with both the local system and/or the host system.

The methodology advances to block 160 and a new agent is generated by the overseer agent 40. The host system or local system may also generate the new agent. The information about every agent is maintained in one of the databases 24, 26 associated with each of these systems 14, 16. Therefore, the information pertaining to the deleted agent is copied into the memory associated with the newly created agent.

The methodology advances to block 165 and the agent executes the work instructions it carries in order to generate new information, as previously described.

Figure 3:
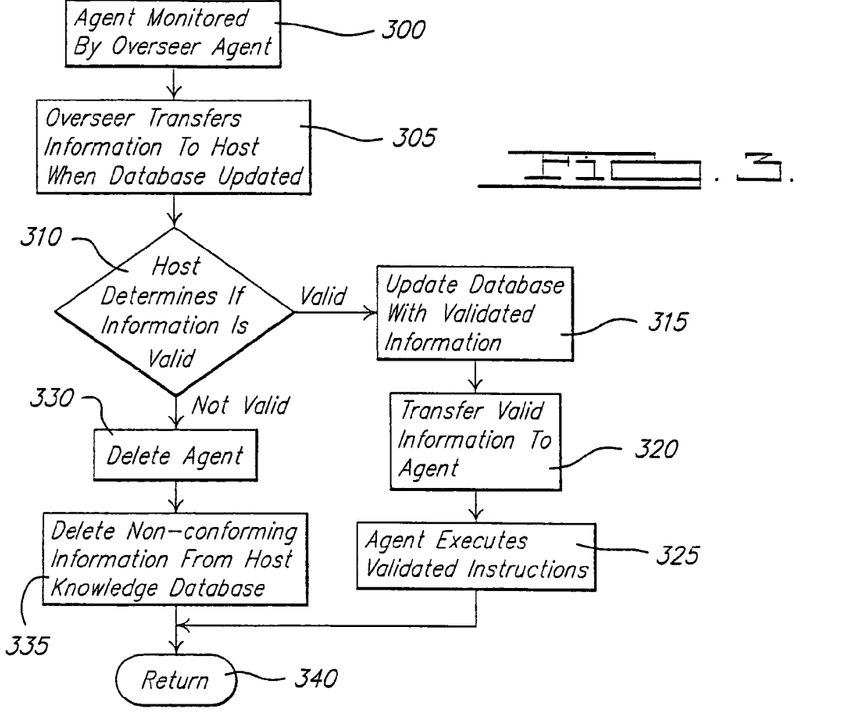
FIG. 3 is a flowchart illustrating the method of validating information from an agent knowledge database using the system of FIG. 1, according to the present invention.
Figure 4A:
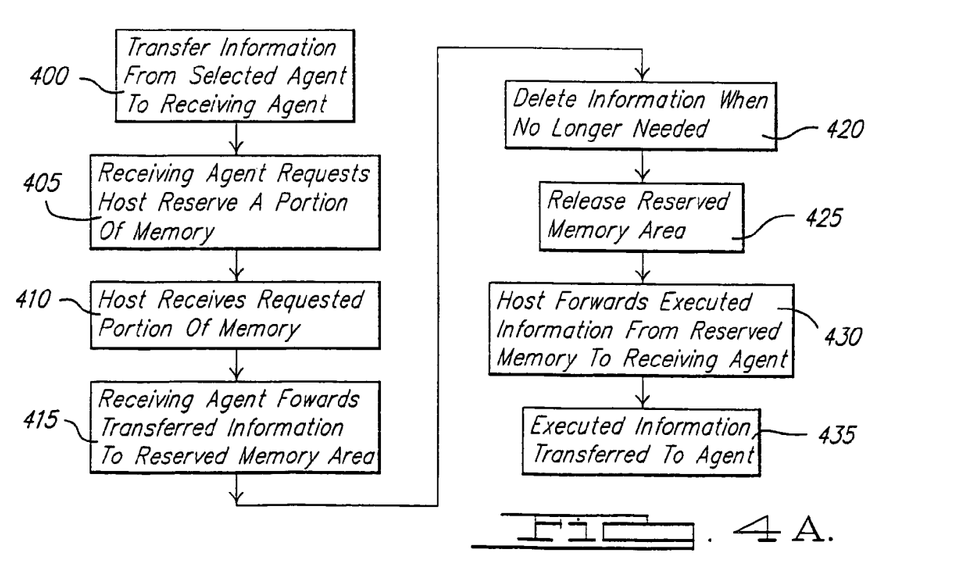
FIG. 4A is a flowchart illustrating a method of transferring information between databases for the system of FIG. 1, according to the present invention.

Referring to FIG. 3, a method of validating the information stored in the knowledge database is provided. In this example the information in the host knowledge database 24 is verified, but the information in the local knowledge database 26 or overseer knowledge database 42 may also be verified in a similar manner. The knowledge database 31 of information associated with each agent is continuously being updated, as each agent executes the particular instructions it carries. In this process, the agent may use adaptive learning to update the agent's knowledge, or other information maintained in the database associated with the agent. There exists the possibility that the learned information may be corrupt in some manner. However, at the time that the agent is executing the instruction, it is unaware whether the information it is obtaining, or has obtained, is accurate. The inclusion of inaccurate information in the agent knowledge database 31 could result in the transfer of this information within the entire system. Advantageously, the consistency and accuracy of the information is improved through management of all the databases in the system and redundancies in checking the information.

As shown in FIG. 2, the intelligent agents 30 may be arranged in a hierarchical manner. Thus, the information is dispersed within the intelligent agent system 10 through the hierarchy of agents via the communications link 36. The agents 30 may be relationally linked, as determined by which agent receives a particular predetermined set of instructions or information. Advantageously, the information transferred within a relational link is validated by this methodology.

The methodology begins when called for, such as from a host agent management program of this example. The methodology begins in block 300 with the step of the overseer agent monitoring the activity of a selected agent. For example, the selected agent may be monitored using the methodology described with respect to FIG. 2. The methodology advances to block 305 and the overseer agent 40 transfers the information obtained by the selected agent 30 to the host system 14. Preferably the information is automatically transferred from a knowledge database 42 associated with the overseer agent to the host system knowledge database 24, when the selected agent's knowledge database is updated. Alternatively, the transfer of information may occur on a periodic basis.

The methodology advances to block 310 and the host system 14 compares the new information from the selected agent to existing general knowledge maintained in the host knowledge database 24, to determine if the new information from the selected agent is valid. For example, the host system 14 may determine if temperature information from the agent 30 is within a predetermined range for a particular component.

The methodology advances to block 315, and if the new information is valid, the host system 14 updates the host knowledge database 24 to include the validated new information from the agent with the existing information already stored in the host knowledge database 24. It should be appreciated that the stored information may be adaptively updated, in a process known as learning.

The methodology advances to block 320 and the host system transfers updated information, such as additional instructions to the agent based on the adaptively learned information. Preferably, the information is transferred by the host system 14 using the overseer agent 40 in a hierarchical manner. The methodology advances to block 325. In block 325, the agent 30 utilizes the updated information, as well as information stored in the agent knowledge database to execute the instructions it has received from the host system.

Returning to block 310, if the knowledge is not valid, the methodology advances to block 330. In block 330, the host system 14 issues instructions that the selected agent be deleted from the system 10, due to the non-conformity in the information carried by the agent 30. The agent 30 is deleted, and the methodology advances to block 335.

In block 335, the host deletes the non-conforming information received from the agent from the host knowledge database 24. The host may add validated information to the database at this time, if it is available. The host system may also notify the local system or overseer agents to delete the non-conforming information received from the agent from their respective knowledge database. The methodology advances to block 340 and the methodology returns control.

Figure 4B:
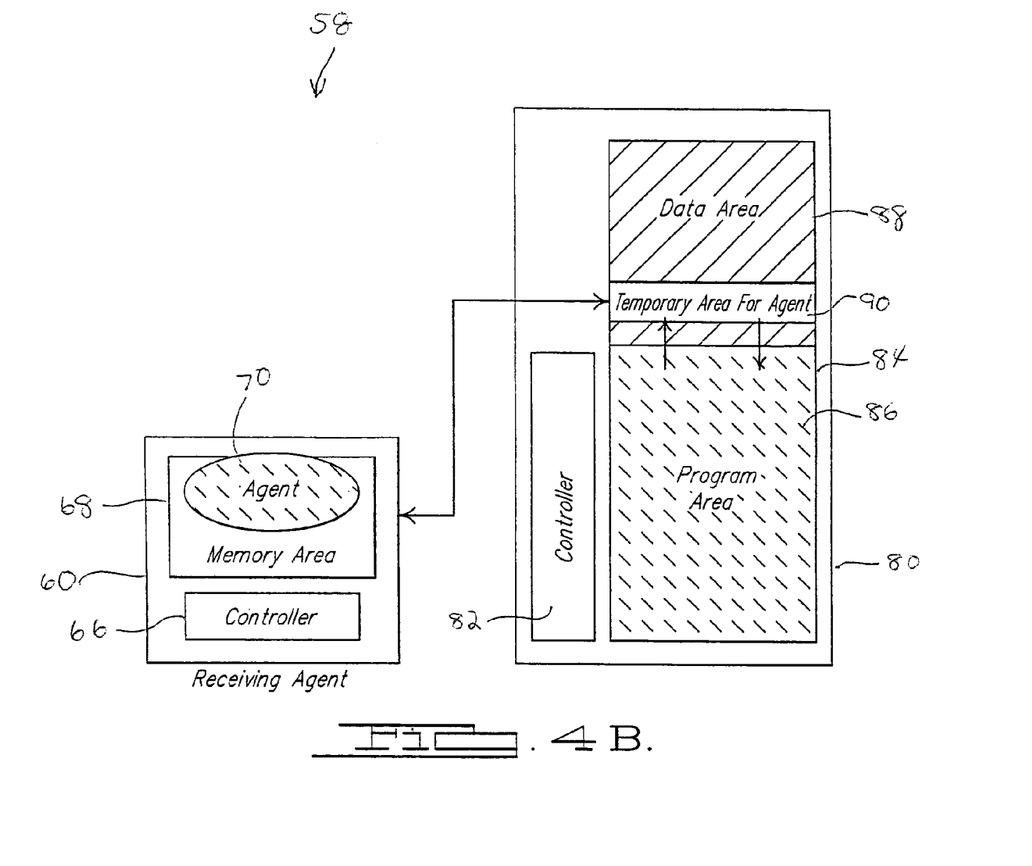
FIG. 4B is a diagram illustrating the relationship between databases using the transfer method of FIG. 4A, according to the present invention.

Referring to FIG. 4a, a method of information transfer between knowledge databases is provided. Referring to FIG. 4b, a diagram of a system 58 for implementing the method of FIG. 4a is illustrated. The system includes a receiving agent at 60, which may be the agent 30 previously described. The receiving agent 60 is operatively in communication with the other agents 30, as well as the host system 14 via the previously described communication network 36. The receiving agent includes a controller 66 and a knowledge database or memory 68. A portion of the receiving agent memory is reserved for information from the agent, as shown at 70. The system also includes a single task central processing unit (CPU) 80. Preferably, the CPU 80 is separate from the receiving agent, and may be part of the overseer agent, local system or host system, as previously described. The CPU 80 includes a controller 82 and a knowledge database 84. The knowledge database 84 is divided into a program area 86 and a data storage area 88. A portion of the data storage area is reserved as a temporary storage area for information from the agent, as shown at 90. An advantage of this methodology is that it utilizes existing hardware.

The methodology begins when called for by an agent management program. As previously described, the agent management program can be part of the host system, or the local system, or the overseer agent.

In block 400, information from a selected agent is transferred into a memory area of a receiving agent 60. The information can be transferred from a source such as the host system, the local system or another agent. The methodology advances to block 405.

In block 405, the receiving agent 60 transmits a request to the CPU 80, requesting that the CPU 80 reserve a portion of memory in its knowledge database 84 for the transmitted information. The methodology advances to block 410 and the CPU reserves a portion of the memory in its database 84 for the information transmitted by the receiving agent, as shown at 90. Preferably, the reserved memory 90 is located in a data storage area 88 of the processor 84 associated with the CPU 80.

The methodology advances to block 415 and the receiving agent 60 forwards the information from the agent to the program area of the CPU. The CPU transfers the information to the reserved memory area 90 of the CPU 80. For example, the information may be program code. It should be appreciated that this reserved memory space 90 is only temporary. The receiving agent 60 executes the work instructions carried by the agent 30.

The methodology advances to block 420, and the CPU 80 deletes the information stored in the reserved memory area of the processor when it is no longer needed. For example, the information is deleted when the receiving agent completes execution of its program instructions. The methodology advances to block 425 and the reserved memory area 90 in the processor 80 is released. The methodology advances to block 430, where the host 14 forwards the executed work instructions/information to the receiving agent 60. The methodology advances to block 435, where the executed information is transferred to the agent. It should be appreciated that this memory space is now available for other uses.

It should be appreciated that the methodology may include other steps necessary for the implementation of the method. Further, the steps may be executed in another order, while achieving the same result. It should also be appreciated that the methodology may be implemented in an iterative manner.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A method of intelligent agent management using an overseer agent within an intelligent agent system for a vehicle, said method including the steps of:
    selecting an agent within the intelligent agent system for the vehicle, wherein the agent includes a processor and a memory associated with the processor and an agent knowledge database;
    receiving an identification code by the agent, wherein the identification code is encrypted and identifies the agent within the intelligent agent system for the vehicle;
    identifying an overseer agent within the intelligent agent system that is operatively in communication with the agent via a communications network, wherein the overseer agent includes a processor and an overseer knowledge database;
    using the overseer agent to determine if the agent identification code has been copied and deleting the agent from the intelligent agent system if the agent identification code has been copied, and continuing to check for a non-conforming agent if the agent identification code has not been copied;
    providing the agent with information from a host system within the intelligent agent system, wherein the host system includes a processor, a memory associated with the processor, an input/output means, and a knowledge database, and the information includes executable instructions for the agent;
    executing the instructions by the agent and updating information in the agent knowledge database with new information generated by executing the instructions;
    transferring the updated information from the agent knowledge database to the overseer agent via the communications network, wherein the transferred information is transferred to the overseer agent knowledge database;
    checking a validity of the transferred information from the agent, by the overseer agent;
    deleting an invalid agent from the intelligent agent system and generating a new agent if the transferred information from the agent is not valid, by the overseer agent.

2. The method as set forth in claim 1, wherein said step of determining if the agent identification code has been copied further includes the step of checking the agent identification code for an indicator flag indicating that the agent identification code is copied.

3. The method as set forth in claim 1 wherein said step of updating the existing information in the agent knowledge database further includes the step of adaptively updating the information stored in the agent knowledge database with the new information learned by executing the instructions.

4. The method as set forth in claim 1 wherein the information includes executable program code containing instructions for work to be performed by the agent.

5. The method as set forth in claim 4 further including the step of using the work instructions in vehicle diagnostics.

6. The method as set forth in claim 1 wherein said step of checking the validity of the transferred information further includes the step of comparing the transferred information to predetermined information stored in the overseer agent database.

7. The method as set forth in claim 1 wherein said step of deleting the invalid agent further includes the step of erasing the invalid agent from the memory of the host system.

8. The method as set forth in claim 1 wherein said step of generating a new agent further includes the step of copying validated information for the deleted agent stored in the overseer agent knowledge database into a knowledge database of the new agent.

9. A method of managing information stored in an intelligent agent knowledge database for an intelligent agent system, said method including the steps of:
    monitoring an agent by an overseer agent within the intelligent agent system, wherein the agent includes a processor and a memory associated with the processor and an agent knowledge database, and the agent executes instructions to obtain information that is stored in the agent knowledge database;
    transferring the information from the agent knowledge database to a host system via a communications network, wherein the host system includes a host computer system having a processor, a memory associated with the processor, an input/output means, and a host knowledge database;
    comparing the transferred information to predetermined information stored in the host knowledge database, to determine if the transferred information is valid;
    updating the predetermined information in the host knowledge database using the validated information, transferring the validated information to the agent for use by the agent, if determined that the transferred information is valid; and
    deleting the agent from the intelligent agent system and the transferred information from the host knowledge database, if determined that the transferred information is not valid.

10. The method as set forth in claim 9 wherein said agents are distributed in a hierarchical arrangement.

11. A method of transferring information between intelligent agents within an intelligent agent system, said method comprising the steps of:
    transferring information from an agent knowledge database for an agent within an intelligent agent system to a memory area of a receiver agent;

requesting, by the receiver agent, that a single task processor having a controller and a database divided into a program area and a data area, reserve a portion of memory in the data area;

forwarding the transferred information from the agent knowledge database to the reserved memory in the single task processor;

storing the transferred information in the reserved memory area until a predetermined condition is met; and deleting the transferred information from the reserved memory of the single task processor when the predetermined condition is met, and releasing the reserved memory for other uses.

12. A system of intelligent agent management using an overseer agent within an intelligent agent system for a vehicle, comprising:

a host system within the intelligent agent system, wherein the host system includes a processor, a memory associated with the processor, an input/output means, and a knowledge database, and the information includes executable instructions;

an agent within the intelligent agent system for the vehicle, wherein the agent includes a processor and a memory associated with the processor and an agent knowledge database;

an overseer agent in communication with the agent via a communications network, wherein the overseer agent includes a processor, a memory associated with the processor and an overseer knowledge database;

an executable overseer agent management program maintained by the overseer agent, wherein the overseer agent management program provides the agent with an identification code that identifies the agent within the intelligent agent system for the vehicle and uses the identification code to determine if the agent identification code has been copied and deletes the agent from the intelligent agent system if the agent identification code has been copied, and if the agent identification code has not been copied provides the agent with information containing executable instructions for the agent, and the instructions are executed and the information in the agent knowledge database is updated with new information and the updated information is transferred from the agent knowledge database to the overseer agent knowledge database, and validity of the transferred information is checked and the agent is deleted from the intelligent agent system and a new agent is generated if the transferred information from the agent is not valid.

13. The system as set forth in claim 12 further comprising:

an executable software program for managing information stored in the knowledge database by transferring the information from the agent to the host system via the communications network, comparing the transferred information to predetermined information stored in the host knowledge database to determine if the transferred information is valid and updating the predetermined information in the host knowledge database using the validated information and transferring the validated information to the agent if the information is valid, and deleting the agent from the intelligent agent system and the transferred information from the host knowledge database, if determined that the information is not valid.

14. The system as set forth in claim 12 further comprising:

a receiver agent having a memory, and information from the agent knowledge database is transferred to the memory of the receiver agent;

a single task processor having controller and a database divided into a program area and a data area, and the receiver agent reserves a portion of the memory in the data area of the single task processor for the transferred information from the agent knowledge database and stores the transferred information in the reserved memory area until a predetermined condition is met and deletes the transferred information from the reserved memory of the processor when the predetermined condition is met, so that the reserved memory is available for other uses.

* * * * *